US012051218B2

(12) United States Patent
Iida et al.

(10) Patent No.: US 12,051,218 B2
(45) Date of Patent: Jul. 30, 2024

(54) REMOTE SUPPORT SYSTEM, TERMINAL DEVICE, AND REMOTE DEVICE

(71) Applicant: FUJIFILM Business Innovation Corp., Tokyo (JP)

(72) Inventors: Kiyoshi Iida, Kanagawa (JP); Hirotake Sasaki, Kanagawa (JP); Toshihiko Suzuki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/553,249

(22) Filed: Dec. 16, 2021

(65) Prior Publication Data
US 2023/0054695 A1 Feb. 23, 2023

(30) Foreign Application Priority Data
Aug. 17, 2021 (JP) ................. 2021-132906

(51) Int. Cl.
*G06T 7/70* (2017.01)
*G06F 3/01* (2006.01)
*G06T 15/00* (2011.01)

(52) U.S. Cl.
CPC ............. *G06T 7/70* (2017.01); *G06F 3/011* (2013.01); *G06T 15/00* (2013.01); *G06T 2207/30204* (2013.01); *G06T 2207/30244* (2013.01)

(58) Field of Classification Search
CPC . G06T 7/70; G06T 15/00; G06T 2207/30204; G06T 2207/30244; G06T 2207/10024; G06T 7/73; G06F 3/011
See application file for complete search history.

(56) References Cited

U.S. PATENT DOCUMENTS 6,556,206 B1 * 4/2003 Benson .................. G06T 19/00
345/473
9,074,899 B2 * 7/2015 Yang .................... G01C 21/206
(Continued)

FOREIGN PATENT DOCUMENTS

JP  2017-068689 A    4/2017
KR  20110072134 A *  6/2011  ............. H04N 5/445
(Continued)

*Primary Examiner* — Mihir K Rayan
(74) *Attorney, Agent, or Firm* — Sughrue Mion, PLLC

(57) ABSTRACT

A remote support system includes: a terminal device; and a remote device, the terminal device including a first processor configured to: transmit, to the remote device, image information obtained by imaging a space including a target object; receive display information that is derived by the remote device in accordance with the image information and three-dimensional position information of an item included in the space, the display information indicating a display position and an orientation of a guidance image to be virtually displayed in a three-dimensional space in an imaging area for the target object; and display the guidance image by using the display information that is received, the remote device including a second processor configured to: receive the image information from the terminal device; derive the display information in accordance with the image information that is received and the three-dimensional position information; and transmit, to the terminal device, the display information that is derived.

21 Claims, 11 Drawing Sheets

(56) References Cited

U.S. PATENT DOCUMENTS

| | | | | |
|---|---|---|---|---|
| 9,928,650 | B2* | 3/2018 | Inomata | G06T 19/006 |
| 10,901,571 | B2 | 1/2021 | Matsuzoe et al. | |
| 2002/0044152 | A1* | 4/2002 | Abbott, III | G06T 19/006 |
| | | | | 345/629 |
| 2006/0052132 | A1* | 3/2006 | Naukkarinen | G01C 21/165 |
| | | | | 455/556.1 |
| 2012/0019645 | A1* | 1/2012 | Maltz | G02B 27/017 |
| | | | | 348/78 |
| 2012/0327252 | A1* | 12/2012 | Nichols | H04N 9/8205 |
| | | | | 348/207.1 |
| 2016/0260261 | A1* | 9/2016 | Hsu | G02B 27/01 |
| 2017/0090722 | A1* | 3/2017 | Matsuzoe | G06F 3/04817 |
| 2019/0075254 | A1* | 3/2019 | Jhawar | H04N 5/2621 |
| 2019/0333263 | A1* | 10/2019 | Melkote Krishnaprasad | |
| | | | | G06F 3/011 |
| 2020/0043354 | A1* | 2/2020 | Ha | G06F 3/0304 |
| 2020/0272223 | A1* | 8/2020 | Joiner | G06V 20/20 |

FOREIGN PATENT DOCUMENTS

| | | | |
|---|---|---|---|
| WO | 2017/056631 | A1 | 4/2017 |
| WO | 2017/158718 | A1 | 9/2017 |

\* cited by examiner

DIRECTION OF TARGET OBJECT

REMOTE SUPPORT SYSTEM, TERMINAL DEVICE, AND REMOTE DEVICE

CROSS-REFERENCE TO RELATED APPLICATIONS

This application is based on and claims priority under 35 USC 119 from Japanese Patent Application No. 2021-132906 filed Aug. 17, 2021.

BACKGROUND (i) Technical Field

The present disclosure relates to a remote support system, a terminal device, and a remote device.

(ii) Related Art

Japanese Unexamined Patent Application Publication No. 2017-068689 discloses a guidance support method directed at guiding a user smoothly to a target. According to the guidance support method, target information is detected from among pieces of space information stored in advance, and the position of a display device in a space defined by the space information and the position of the target defined by the target information are measured. In addition, according to the guidance support method, on the basis of the position of the display device and the position of the target, which have been measured, the position of an icon to be displayed on the display device and the movement of the icon are determined, and the icon is displayed with the determined movement and at the determined position on the display device. Furthermore, according to the guidance support method, in accordance with a change in the position of the display device, the position and the movement of the icon to be displayed on the display device are changed.

In addition, International Publication No. 2017/056631 discloses an information processing system that controls display of information to be input by using a reception device of a captured image. The information processing system includes a control unit that controls display of an integrated image, the integrated image being obtained by integrating first information and second information. The first information is generated in accordance with an input to a first system that receives the captured image obtained by an image capturing system. The second information is generated in accordance with an input to a second system that receives the captured image obtained by the image capturing system.

Furthermore, International Publication No. 2017/158718 discloses a remote operation support device including an on-site terminal having an imaging unit that captures a video seen from an operator and an instruction terminal that transmits and receives information to and from the on-site terminal. The instruction terminal in the remote operation support device includes a position-and-direction estimating unit and an on-site condition image generating unit. The position-and-direction estimating unit estimates the position and direction of the operator from the video captured by the imaging unit. The on-site condition image generating unit generates an image indicating an on-site condition including the position of the operator from results of the estimation by the position-and-direction estimating unit. The instruction terminal in the remote operation support device further includes an instruction-side display unit, an operation instruction receiving unit, and a direction calculating unit. The instruction-side display unit displays a screen including the image generated by the on-site condition image generating unit. The operation instruction receiving unit receives information indicating the next operation position that is input by an operation instructor on the screen displayed by the instruction-side display unit. The direction calculating unit calculates the direction to the next operation position from results of the estimation by the position-and-direction estimating unit and results of the reception by the operation instruction receiving unit. Furthermore, the on-site terminal in the remote operation support device includes a guidance image generating unit and an on-site-side display unit. The guidance image generating unit generates an image indicating the direction to the next operation position from results of the calculation by the direction calculating unit. The on-site-side display unit displays a screen including the image generated by the guidance image generating unit.

SUMMARY

Aspects of non-limiting embodiments of the present disclosure relate to a remote support system, a terminal device, and a remote device that may guide a user to a required imaging position and a required imaging orientation more accurately than in a case where an instruction for an imaging direction is not provided.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a remote support system including: a terminal device; and a remote device, the terminal device including a first processor configured to: transmit, to the remote device, image information obtained by imaging a space including a target object; receive display information that is derived by the remote device in accordance with the image information and three-dimensional position information of an item included in the space, the display information indicating a display position and an orientation of a guidance image to be virtually displayed in a three-dimensional space in an imaging area for the target object; and display the guidance image by using the display information that is received, the remote device including a second processor configured to: receive the image information from the terminal device; derive the display information in accordance with the image information that is received and the three-dimensional position information; and transmit, to the terminal device, the display information that is derived.

BRIEF DESCRIPTION OF THE DRAWINGS

An exemplary embodiment of the present disclosure will be described in detail based on the following figures, wherein.

DETAILED DESCRIPTION

Now, an exemplary embodiment of the present disclosure will be described below in detail with reference to the drawings. Note that the exemplary embodiment will illustrate a case where the present disclosure is applied to a remote support system including plural terminal devices and a remote device. Each of the terminal devices is a mobile terminal used individually by a corresponding user. The remote device is provided at a place that is remote from the terminal devices. In addition, the exemplary embodiment will illustrate a case where the user is an operator who maintains an image forming device such as a digital multi-function device or a printer and where the remote support system is a system that remotely supports the maintenance of the image forming device by the operator.

Figure 1:
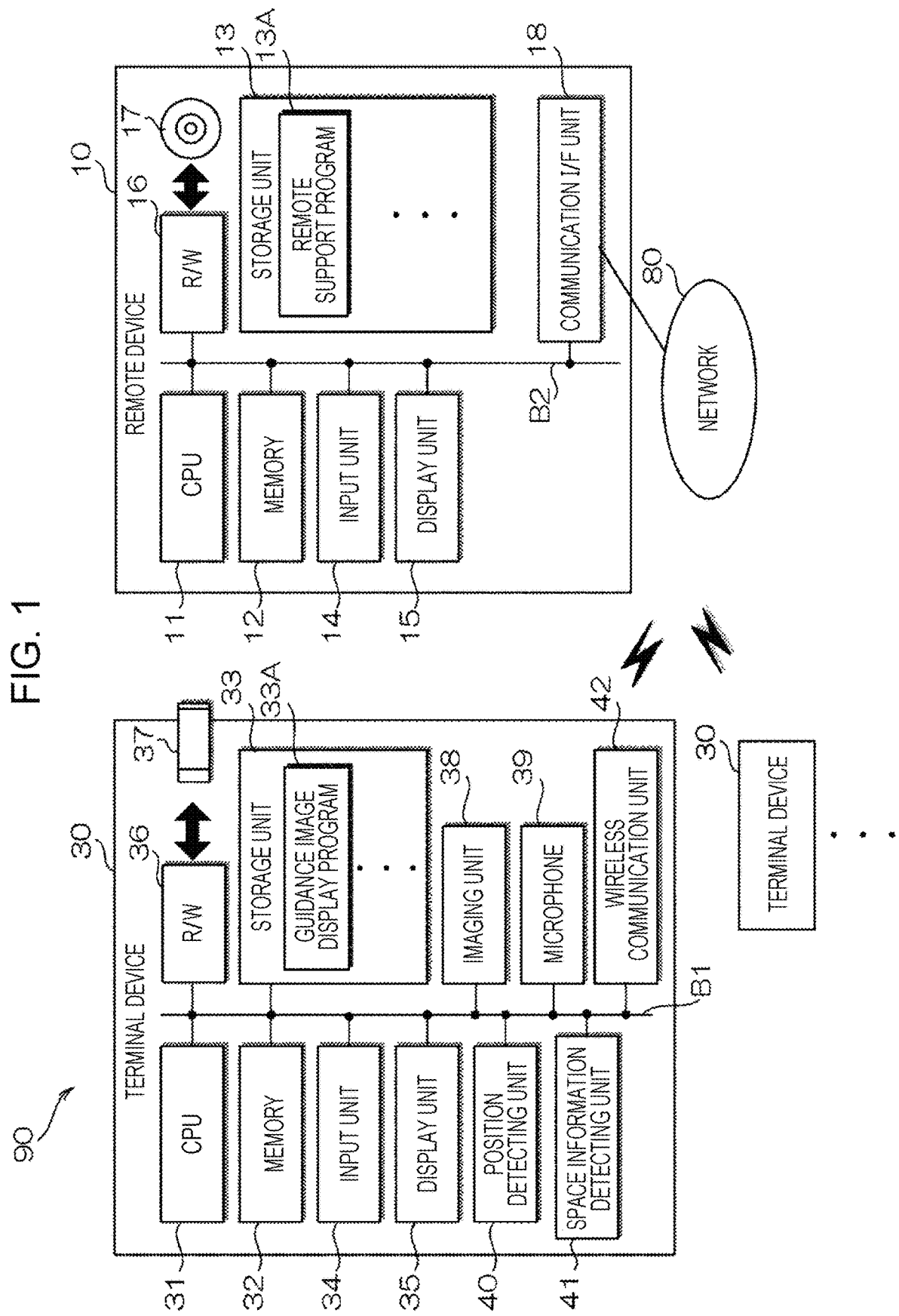
FIG. 1 is a block diagram illustrating an example of a hardware configuration of a remote support system according to the exemplary embodiment.
Figure 2:
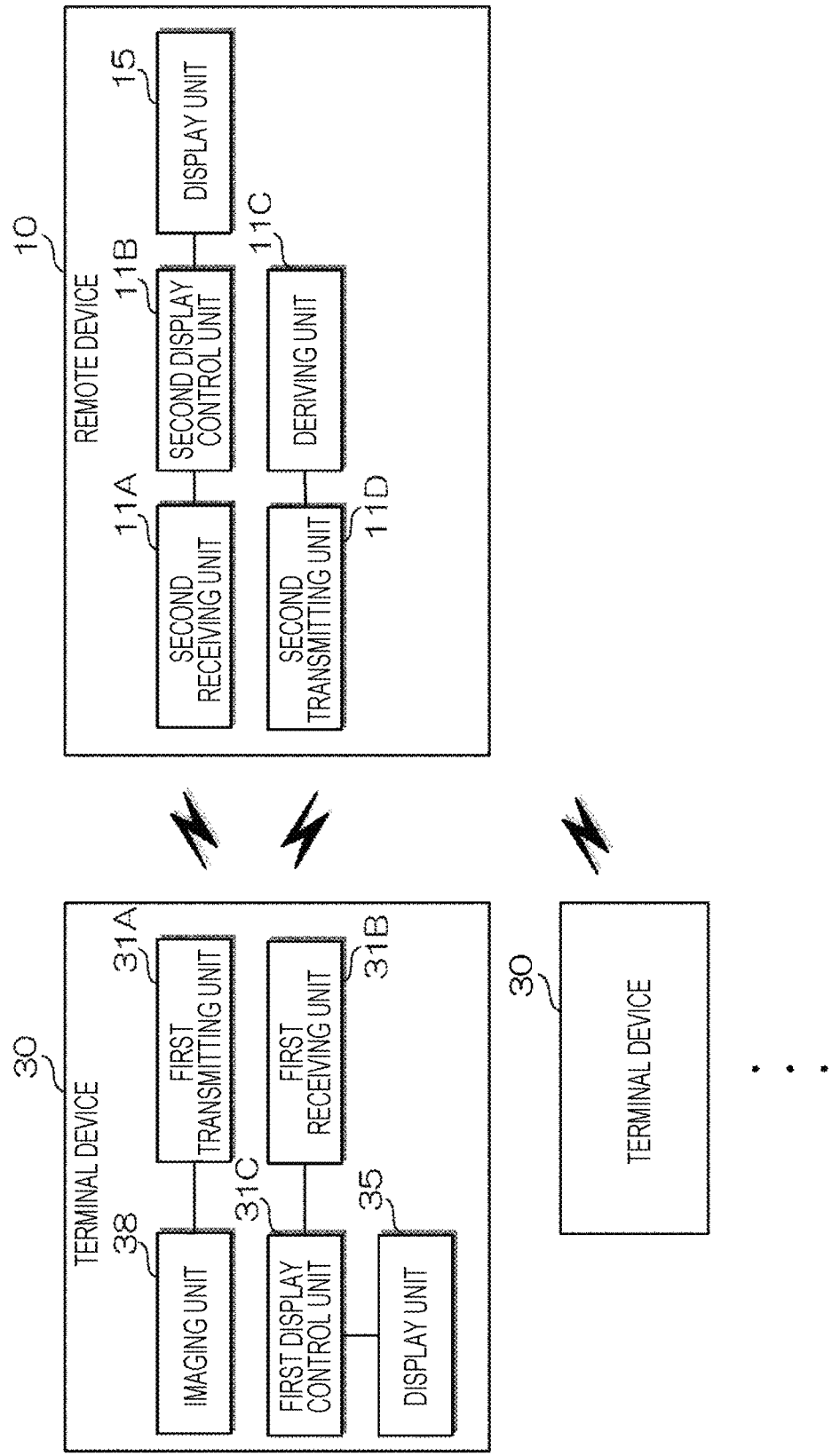
FIG. 2 is a block diagram illustrating an example of a functional configuration of the remote support system according to the exemplary embodiment.

First, configurations of a remote support system 90 according to the exemplary embodiment will be described with reference to FIGS. 1 and 2. FIG. 1 is a block diagram illustrating an example of a hardware configuration of the remote support system 90 according to the exemplary embodiment. FIG. 2 is a block diagram illustrating an example of a functional configuration of the remote support system 90 according to the exemplary embodiment.

As illustrated in FIG. 1, the remote support system 90 according to the exemplary embodiment includes a remote device 10 and plural terminal devices 30. The remote device 10 and each of the terminal devices 30 are capable of accessing a network 80. Note that examples of the remote device 10 include an information processing device such as a personal computer or a server computer. Examples of the terminal device 30 include a mobile terminal such as a smartphone, a tablet terminal, or a personal digital assistant (PDA, mobile information terminal).

The terminal device 30 according to the exemplary embodiment is a device owned by a corresponding one of plural users who use the remote support system 90 (hereinafter simply referred to as "user") when maintaining the image forming device. The terminal device 30 includes a central processing unit (CPU) 31, a memory 32 as a temporary storage area, a non-volatile storage unit 33, an input unit 34 that is a touch panel or the like, a display unit 35 that is a liquid crystal display or the like, and a medium reader/writer (R/W) 36. The terminal device 30 further includes an imaging unit 38, a microphone 39, a position detecting unit 40, a space information detecting unit 41, and a wireless communication unit 42. The CPU 31, the memory 32, the storage unit 33, the input unit 34, the display unit 35, the medium reader/writer 36, the imaging unit 38, the microphone 39, the position detecting unit 40, the space information detecting unit 41, and the wireless communication unit 42 are connected to one another via a bus B1. The medium reader/writer 36 reads information written on a recording medium 37 and writes information to the recording medium 37.

The storage unit 33 is implemented by a hard disk drive (HDD), a solid state drive (SSD), a flash memory, or the like. The storage unit 33 as a storage medium stores a guidance image display program 33A. The recording medium 37, on which the guidance image display program 33A is written, is set in the medium reader/writer 36, and the medium reader/writer 36 reads the guidance image display program 33A from the recording medium 37, and thereby the guidance image display program 33A is stored in the storage unit 33. The CPU 31 reads the guidance image display program 33A from the storage unit 33, loads the guidance image display program 33A into the memory 32, and sequentially performs processes included in the guidance image display program 33A.

The imaging unit 38 according to the exemplary embodiment images the image forming device that is a maintenance target and outputs image information obtained by the imaging. The microphone 39 according to the exemplary embodiment collects a voice of the user and outputs voice information.

The position detecting unit 40 according to the exemplary embodiment detects the position of the terminal device 30 and outputs position information. In the exemplary embodiment, the position detecting unit 40 uses the global positioning system (GPS). However, the present disclosure is not limited to this exemplary embodiment. For example, the position detecting unit 40 may use position information acquired from a Wi-Fi (registered trademark) router, may detect the position by using a beacon, or may detect the position through image analysis using a captured image.

The space information detecting unit 41 according to the exemplary embodiment detects information indicating a three-dimensional position of an item included in a space in front of the terminal device 30 (hereinafter referred to as "three-dimensional position information"). The space information detecting unit 41 according to the exemplary embodiment detects the three-dimensional position information in a space corresponding to an imaging angle of view of the imaging unit 38. In the exemplary embodiment, a depth sensor is used as the space information detecting unit 41. However, the present disclosure is not limited to this exemplary embodiment. For example, a three-dimensional scanner or the like may also be used as the space information detecting unit 41.

The remote device 10, on the other hand, is a device that plays a major role in the remote support system 90 and that derives a guidance image, which will be described later in detail, to be presented to the user. The remote device 10 includes a CPU 11, a memory 12 as a temporary storage area, a non-volatile storage unit 13, an input unit 14 such as a keyboard or a mouse, a display unit 15 such as a liquid crystal display, a medium reader/writer 16, and a communication interface (I/F) unit 18. The CPU 11, the memory 12, the storage unit 13, the input unit 14, the display unit 15, the medium reader/writer 16, and the communication I/F unit 18 are connected to one another via a bus B2. The medium reader/writer 16 reads information written on a recording medium 17 and writes information to the recording medium 17.

The storage unit 13 is implemented by an HDD, an SSD, a flash memory, or the like. The storage unit 13 as a storage medium stores a remote support program 13A. The recording medium 17, on which the remote support program 13A is written, is set in the medium reader/writer 16, and the medium reader/writer 16 reads the remote support program 13A from the recording medium 17, and thereby the remote support program 13A is stored in the storage unit 13. The CPU 11 reads the remote support program 13A from the storage unit 13, loads the remote support program 13A into the memory 12, and sequentially performs processes included in the remote support program 13A.

Note that a public communication line such as the Internet or a telephone network is used as the network 80 in the exemplary embodiment. However, the present disclosure is not limited to this exemplary embodiment. For example, a communication line in a company such as a local area network (LAN) or a wide area network (WAN) may be used as the network 80, or a combination of such a communication line in a company and a public communication line may be used as the network 80.

Next, functional configurations of the remote device 10 and the terminal device 30 according to the exemplary embodiment will be described with reference to FIG. 2.

As illustrated in FIG. 2, the terminal device 30 according to the exemplary embodiment includes a first transmitting unit 31A, a first receiving unit 31B, and a first display control unit 31C. By executing the guidance image display program 33A, the CPU 31 of the terminal device 30 functions as the first transmitting unit 31A, the first receiving unit 31B, and the first display control unit 31C.

The first transmitting unit 31A according to the exemplary embodiment transmits, to the remote device 10, image information obtained by imaging a space including a target object (hereinafter also referred to as "image information"). Note that the image forming device that is a maintenance target is used as the target object in the exemplary embodiment, as described above.

The first receiving unit 31B according to the exemplary embodiment receives display information that is derived by the remote device 10 in accordance with the image information and three-dimensional position information of an item included in the above space (hereinafter simply referred to as "display information"), the display information indicating a display position and an orientation of a guidance image to be virtually displayed in a three-dimensional space in an imaging area for the target object. Note that the first transmitting unit 31A transmits the image information, and the first receiving unit 31B receives the display information via the wireless communication unit 42 in the exemplary embodiment. However, the present disclosure is not limited to this exemplary embodiment.

The first display control unit 31C according to the exemplary embodiment causes the display unit 35 to display the guidance image by using the display information that is received.

As illustrated in FIG. 2, the remote device 10 according to the exemplary embodiment, on the other hand, includes a second receiving unit 11A, a second display control unit 11B, a deriving unit 11C, and a second transmitting unit 11D. By executing the remote support program 13A, the CPU 11 of the remote device 10 functions as the second receiving unit 11A, the second display control unit 11B, the deriving unit 11C, and the second transmitting unit 11D.

The second receiving unit 11A according to the exemplary embodiment receives the image information from the terminal device 30. The deriving unit 11C according to the exemplary embodiment derives the above display information in accordance with the image information that is received and the three-dimensional position information that is described above. Furthermore, the second transmitting unit 11D according to the exemplary embodiment transmits, to the terminal device 30, the display information that is derived.

Note that, in the remote support system 90 according to the exemplary embodiment, the second display control unit 11B causes the display unit 15 to display a guidance image setting screen, which will be described later in detail, by using the image information that is received and the three-dimensional position information that is described above. The deriving unit 11C according to the exemplary embodiment causes a person who uses the remote device 10 to set, on the guidance image setting screen displayed on the display unit 15, the display position and the orientation of the guidance image to derive the display information.

In the exemplary embodiment, image information indicating a still image is used as the image information. Thus, the imaging unit 38 provided in the terminal device 30 is capable of capturing a still image. However, the present disclosure is not limited to this exemplary embodiment. For example, it is needless to say that an imaging unit capable of capturing both a still image and a moving image may also be used as the imaging unit 38. In addition, in the exemplary embodiment, image information indicating a color image is used as the image information, and thus, the imaging unit 38 according to the exemplary embodiment is capable of capturing a color image. However, the present disclosure is not limited to this exemplary embodiment. For example, image information indicating a monochrome image may also be used as the image information, and an imaging unit capable of capturing a monochrome image may also be used as the imaging unit 38.

In addition, in the exemplary embodiment, the three-dimensional position information to be used by the remote device 10 is obtained by the space information detecting unit 41 of the terminal device 30, transmitted by the first transmitting unit 31A thereof, and received by the second receiving unit 11A of the remote device 10. However, the present disclosure is not limited to this exemplary embodiment, and three-dimensional position information may be separately obtained by using measuring equipment different from the space information detecting unit 41 of the terminal device 30 and may be stored in the storage unit 13 of the remote device 10 in advance.

Figure 3:
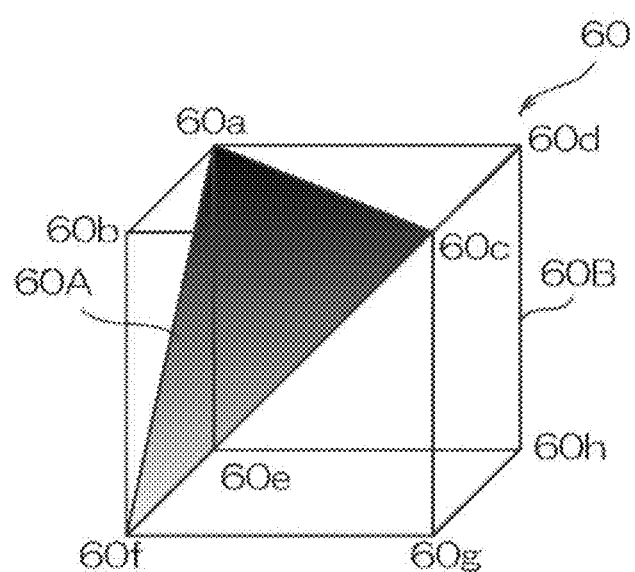
FIG. 3 illustrates a perspective view of an example of a guidance image according to the exemplary embodiment.

In addition, in the exemplary embodiment, the guidance image has an instruction plane that is virtually displayed at the above display position and with the above orientation in the above three-dimensional space. In particular, the guidance image according to the exemplary embodiment is a polyhedron having the instruction plane. Furthermore, the polyhedron according to the exemplary embodiment is a regular polyhedron. FIG. 3 illustrates a perspective view of an example of a guidance image 60 according to the exemplary embodiment.

As illustrated in FIG. 3, the guidance image 60 according to the exemplary embodiment is a polyhedron 60B having an instruction plane 60A as the above-described instruction plane, and the polyhedron 60B is a regular hexahedron.

The instruction plane 60A of the guidance image 60 according to the exemplary embodiment is a plane that is inside the polyhedron 60B and that has, as vertices, some of vertices 60a to 60h of the polyhedron 60B (vertices 60a, 60c, and 60f in the example illustrated in FIG. 3). Thus, in this case, the instruction plane 60A is a regular triangle when viewed in the direction facing the instruction plane 60A.

In the above manner, in the exemplary embodiment, a guidance image including the polyhedron 60B is used as the guidance image. However, the present disclosure is not limited to this exemplary embodiment. For example, the instruction plane 60A may also be used alone as a guidance image not including the polyhedron 60B.

Furthermore, the first display control unit 31C according to the exemplary embodiment changes a display state of the guidance image 60 in accordance with a deviation amount between an actual imaging state of the terminal device 30 and an imaging state corresponding to the above display position and the above orientation. Here, in the exemplary embodiment, a transmittance is used as the above display state and is increased as the above deviation amount decreases. However, the present disclosure is not limited to this exemplary embodiment, and, instead of the transmittance, any one of a blinking interval and a display color may also be used as the above display state, or a combination of two or three of the blinking interval, the display color, and the transmittance may also be used as the display state.

In addition, in the exemplary embodiment, when the first display control unit 31C images a target position of the target object, a marker is virtually displayed at the target position.

Figure 4:
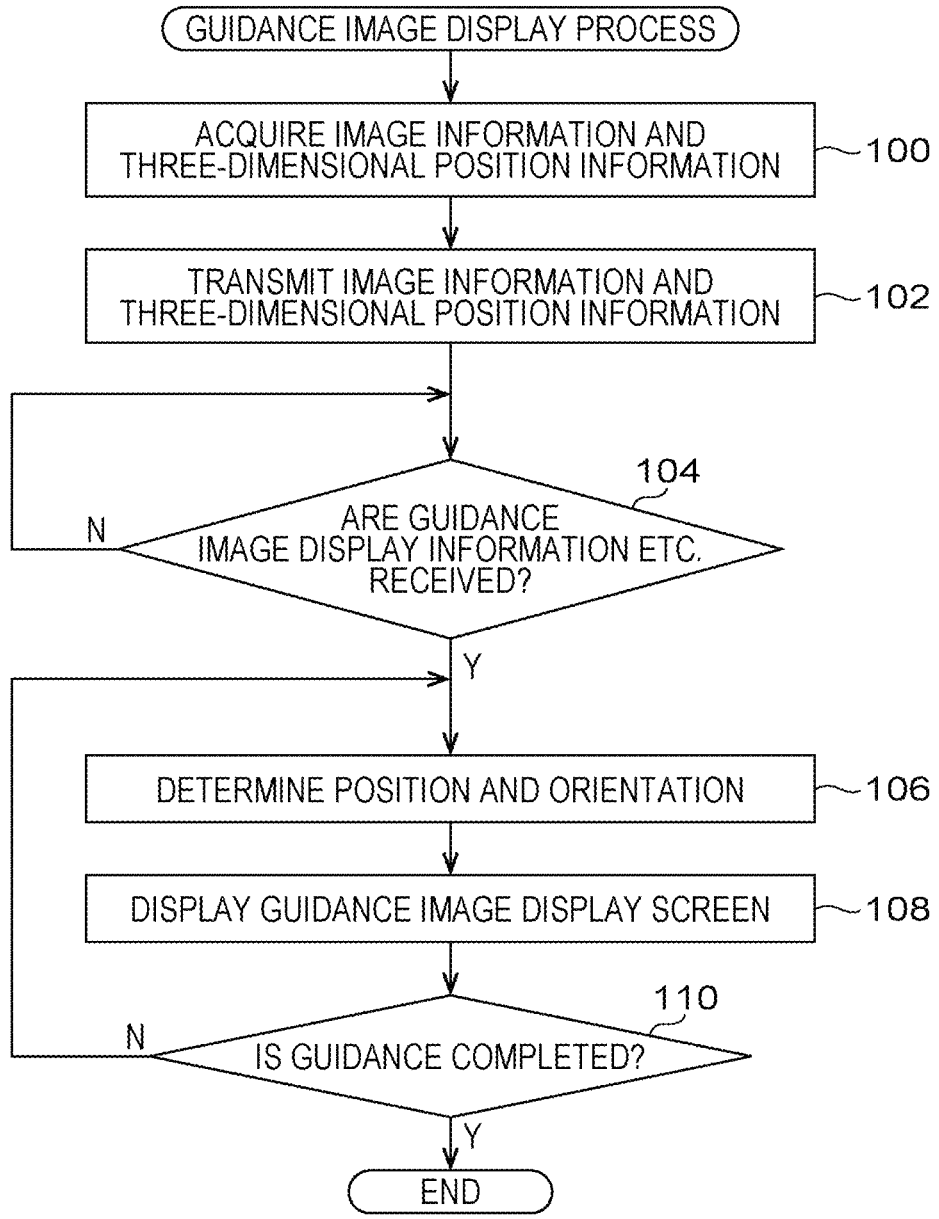
FIG. 4 is a flowchart illustrating an example of a guidance image display process according to the exemplary embodiment.

Next, operations of the remote support system 90 according to the exemplary embodiment will be described with reference to FIGS. 4 to 9. First, operations of the terminal device 30 according to the exemplary embodiment will be described with reference to FIGS. 4 to 6. FIG. 4 is a flowchart illustrating an example of a guidance image display process according to the exemplary embodiment. Note that a process for providing an instruction regarding a target operation of remote support by the remote support system 90 will be omitted from the following description to avoid complexity, and a process for guiding a user to a required imaging position and a required imaging orientation will be described below.

In the remote support system 90 according to the exemplary embodiment, the user images a space including a target object in a predetermined direction (toward the front surface of the target object in the exemplary embodiment) by using the terminal device 30, and image information obtained by the imaging unit 38 in response to the imaging and three-dimensional position information obtained by the space information detecting unit 41 at the same timing as the imaging are stored in the storage unit 33.

When the user inputs an instruction for executing the guidance image display process to the terminal device 30 in this state, the CPU 31 of the terminal device 30 executes the guidance image display program 33A to execute the guidance image display process illustrated in FIG. 4.

In step 100 in FIG. 4, the CPU 31 reads the image information and the three-dimensional position information from the storage unit 33. In step 102, the CPU 31 transmits, to the remote device 10, the image information and the three-dimensional position information that are acquired.

Although details will be described later, upon reception of the image information and the three-dimensional position information, the remote device 10 derives the above-described display information (hereinafter referred to as "guidance image display information") by using the image information and the three-dimensional position information. The guidance image display information is information for displaying the guidance image 60 for guiding the user to the required imaging position and the required imaging orientation. Subsequently, the remote device 10 transmits the derived guidance image display information to the terminal device 30 that is an access source. At this time, the remote device 10 transmits, to the terminal device 30, together with the guidance image display information, marker display information for virtually displaying a marker at a target position for maintenance of a target object.

In step 104, the CPU 31 waits until receiving the guidance image display information and the marker display information from the remote device 10.

In step 106, the CPU 31 determines each of an imaging position and an orientation (equivalent to imaging direction) of the terminal device 30 at this time point. Here, information indicating the above imaging position is obtained from the position detecting unit 40. In addition, information indicating the above orientation is obtained by a gyrosensor (omitted from illustration) incorporated in the terminal device 30. However, the present disclosure is not limited to this exemplary embodiment. For example, information indicating the above orientation may also be obtained by an acceleration sensor or the like, instead of the gyrosensor.

Figure 5:
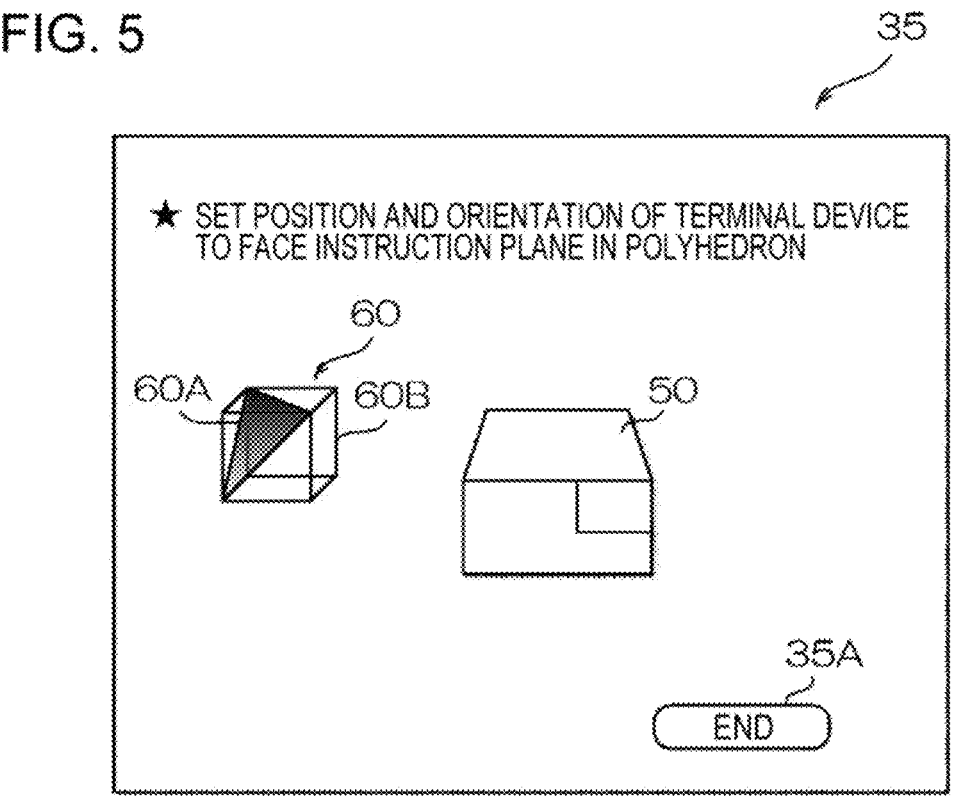
FIG. 5 illustrates a front view of an example of the guidance image display screen according to the exemplary embodiment.

In step 108, the CPU 31 controls the display unit 35 to display a guidance image display screen having a predetermined configuration by using the guidance image display information and the marker display information that are received, the imaging position and the orientation of the terminal device 30 that are determined, and an image that is captured by the imaging unit 38 at this time point (hereinafter referred to as "actual captured image"). FIG. 5 illustrates an example of the guidance image display screen according to the exemplary embodiment.

As illustrated in FIG. 5, the guidance image display screen according to the exemplary embodiment displays a message for encouraging the user to set the imaging position and the orientation of the terminal device 30 so as to face the instruction plane 60A in the polyhedron 60B in the guidance image 60. In addition, on the guidance image display screen according to the exemplary embodiment, the guidance image 60 is displayed by being superimposed on the actual captured image such that the instruction plane 60A corresponds to the display position and the orientation indicated by the guidance image display information. Furthermore, on the guidance image display screen according to the exemplary embodiment, in accordance with a deviation amount between an actual imaging state and an imaging state corresponding to the required imaging position and the required imaging orientation, the display state (transmittance in the exemplary embodiment) of the guidance image 60 is sequentially changed (increased as the deviation amount decreases in the exemplary embodiment).

That is to say, the guidance image 60 according to the exemplary embodiment is a three-dimensional image in which the instruction plane 60A becomes a regular triangle when the imaging position and the orientation of the terminal device 30 correspond to the required imaging position and the required imaging orientation.

When the imaging position and the orientation of the terminal device 30 differ from the required imaging position and the required imaging orientation, the guidance image 60 in a case where the guidance image 60, in which the instruction plane 60A becomes a regular triangle with the required imaging position and the required imaging orientation, is viewed in this state is displayed at the imaging position on the terminal device 30 according to the exemplary embodiment.

The example illustrated in FIG. 5 is an example of the guidance image display screen in a case where a target object 50 is imaged to face the front surface thereof at this time point and where the required imaging position faces the left side surface of the target object 50. In this case, the instruction plane 60A of the guidance image 60 is distorted from a regular triangle, and the size thereof decreases as the distance from the terminal device 30 to the required imaging position becomes longer. Accordingly, by referring to the guidance image display screen, the user is able to intuitively grasp the required imaging position and the required imaging orientation for the target object 50, on the basis of the display position and the size of the guidance image 60 and the shape of the instruction plane 60A.

Figure 6:
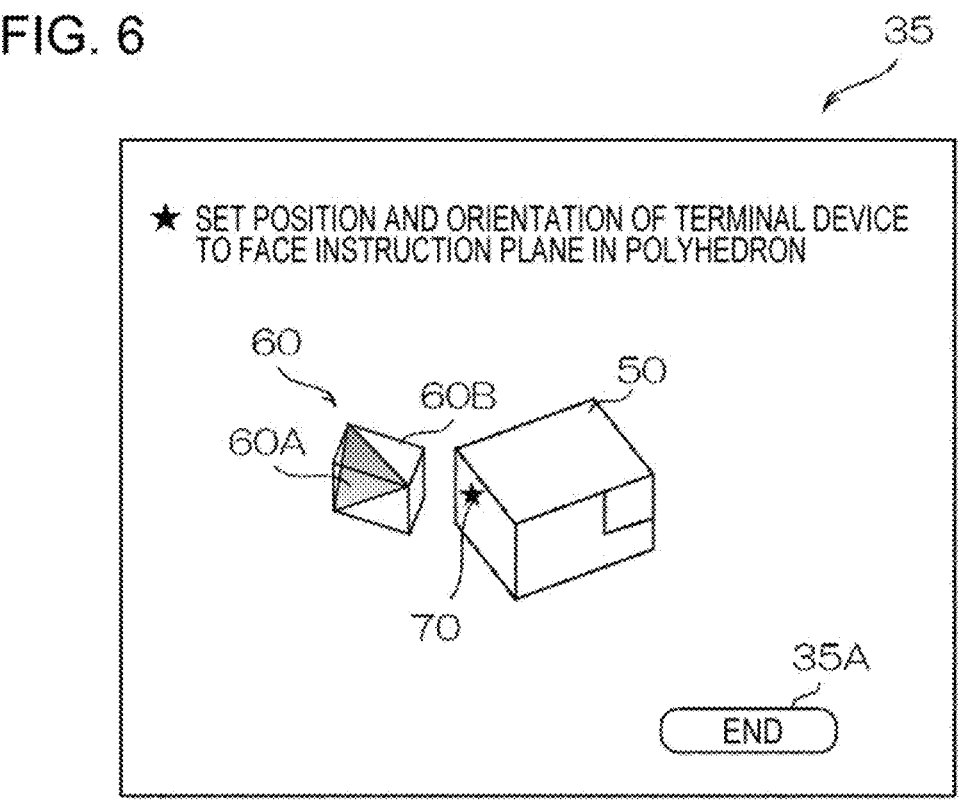
FIG. 6 illustrates a front view of another example of the guidance image display screen according to the exemplary embodiment.

The example illustrated in FIG. 6 is an example of the guidance image display screen in a case where the terminal device 30 becomes closer to the required imaging position and the required imaging orientation from the example illustrated in FIG. 5. In this case, the target object 50 is displayed in a state of being imaged to face the left side surface thereof, and the instruction plane 60A of the guidance image 60 becomes almost a regular triangle. In addition, since the target position is included in the imaging angle of view in this case, a marker 70 as the above-described marker is displayed. Accordingly, the user is also able to grasp the target position.

Note that the terminal device 30 sequentially generates information indicating the guidance image 60 having a different display position, shape, size, and transmittance depending on the imaging position and the orientation of the terminal device 30 in the exemplary embodiment. However, the present disclosure is not limited to this exemplary embodiment. For example, the remote device 10 may sequentially generate information indicating the guidance image 60 and may transmit the information to the terminal device 30.

In step 110, the CPU 31 determines whether the terminal device 30 is at the required imaging position and with the required imaging orientation and guiding of the user to a destination is completed. If the determination is negative, the process returns to step 106; if the determination is positive, the guidance image display process ends.

Through a repeated process of steps 106 to 110, the display unit 35 of the terminal device 30 displays the target object 50 imaged by the terminal device 30, and also displays the guidance image 60 in a superimposed manner in accordance with the imaging position and the orientation of the terminal device 30. Accordingly, by referring to the display screen, the user is able to intuitively move the terminal device 30 to the required imaging position and the required imaging orientation.

Upon ending of the guidance image display process, a remote support process for expected maintenance of the target object 50 is executed by using a technique of the known related art.

Figure 7:
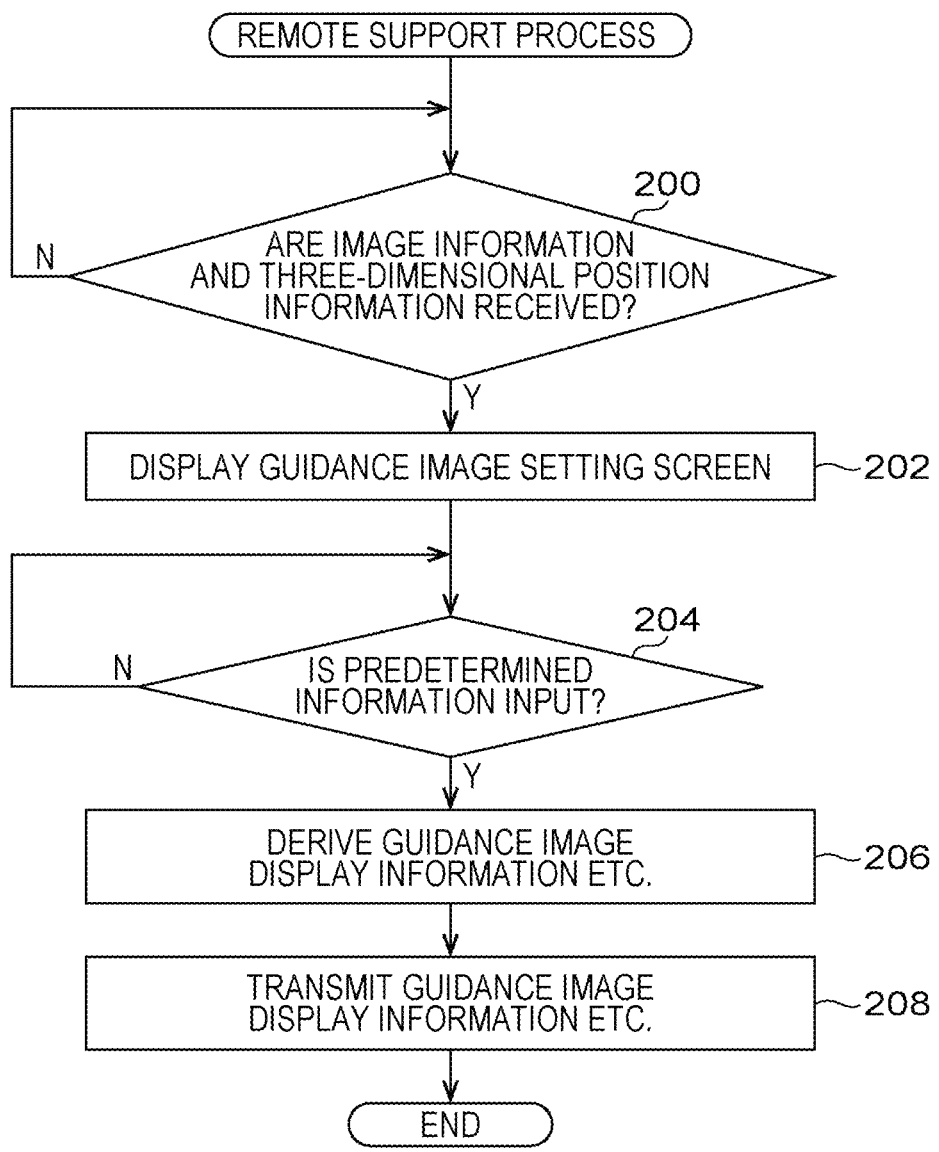
FIG. 7 is a flowchart illustrating an example of a remote support process according to the exemplary embodiment.

Next, operations of the remote device 10 according to the exemplary embodiment will be described with reference to FIGS. 7 to 9. FIG. 7 is a flowchart illustrating an example of a remote support process according to the exemplary embodiment. Note that a case where the user is remotely instructed by a person who uses the remote device 10 (hereinafter also referred to as "remote instructor") will be described here.

In the remote support system 90 according to the exemplary embodiment, the remote support process illustrated in FIG. 7 is executed by the CPU 11 of the remote device 10 starting execution of the remote support program 13A at each predetermined period (every 10 minutes in the exemplary embodiment) in available hours (hours from 8:00 am to 5:00 pm in the exemplary embodiment) on available days (weekdays in the exemplary embodiment) of the remote support system 90 by the user.

In step 200 in FIG. 7, the CPU 11 waits until receiving the image information and the three-dimensional position information from any of the terminal devices 30. In step 202, the CPU 11 controls the display unit 15 to display the guidance image setting screen having a predetermined configuration by using the image information and the three-dimensional position information that are received.

Subsequently, in step 204, the CPU 11 waits for an input of predetermined information. FIG. 8 illustrates an example of the guidance image setting screen according to the exemplary embodiment.

Figure 8:
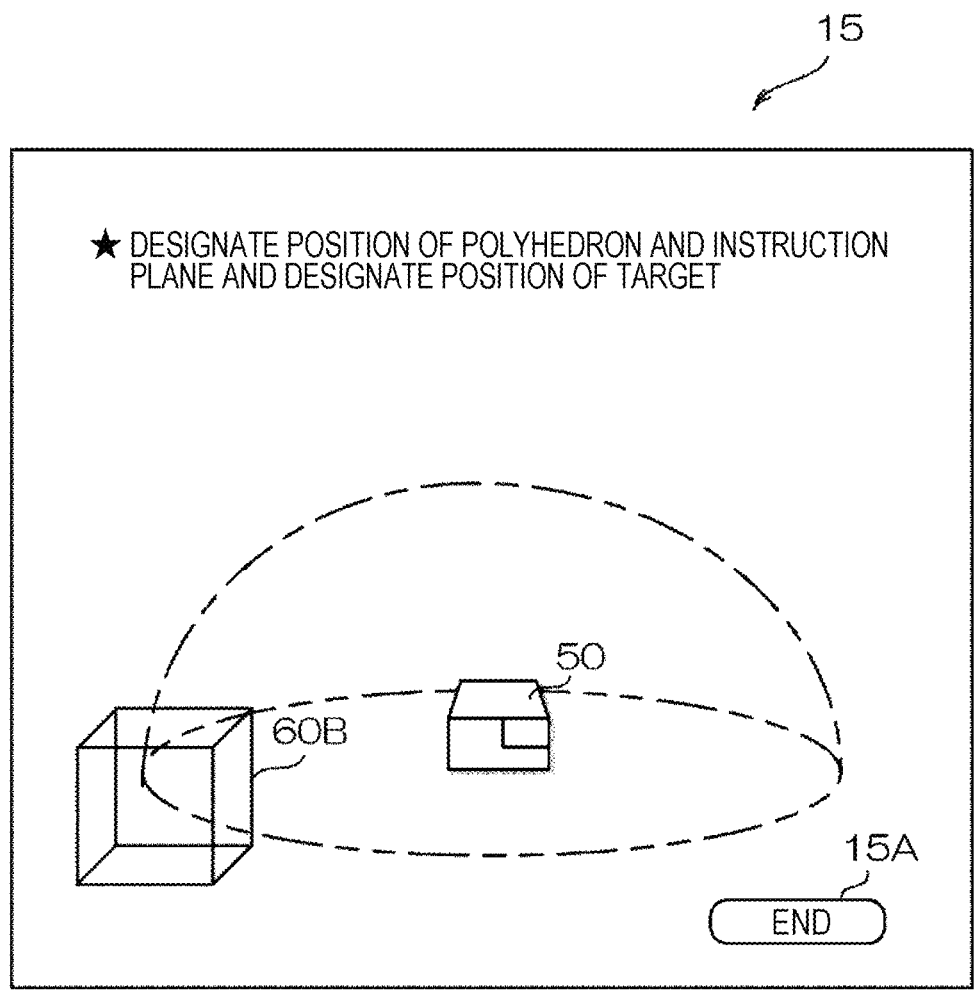
FIG. 8 illustrates a front view of an example of a guidance image setting screen according to the exemplary embodiment.
Figure 9:
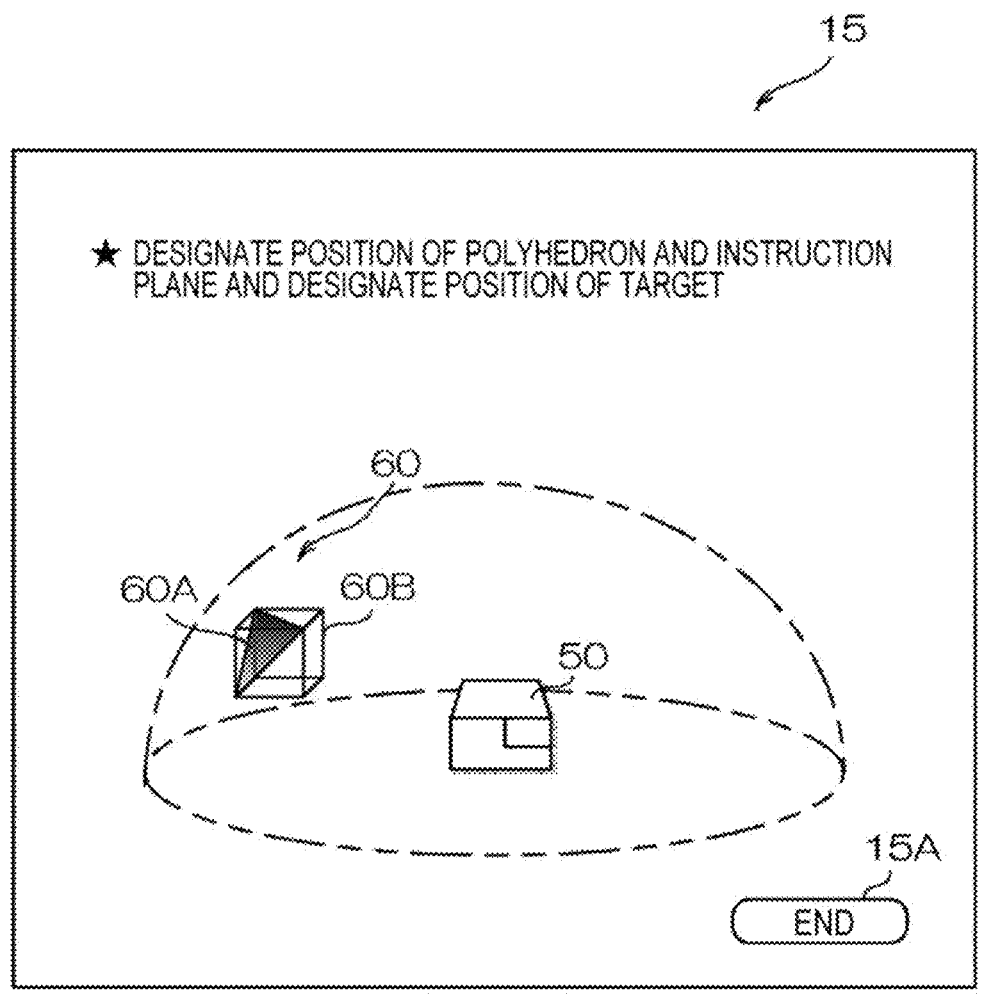
FIG. 9 illustrates a front view of another example of the guidance image setting screen according to the exemplary embodiment.

As illustrated in FIG. 8, a message for encouraging the remote instructor to designate the position of the polyhedron and the instruction plane and a message for encouraging the remote instructor to designate the above-described target position are displayed on the guidance image setting screen according to the exemplary embodiment. In addition, by using a captured image indicated by the received image information and a three-dimensional position of each item indicated by the received three-dimensional position information, the three-dimensional space in the imaging area corresponding to the captured image is virtually displayed in a state of including the target object 50 on the guidance image setting screen according to the exemplary embodiment. Furthermore, the polyhedron 60B in the guidance image 60 is displayed at a predetermined default position and with a default size on the guidance image setting screen according to the exemplary embodiment.

Accordingly, by referring to the guidance image setting screen, the remote instructor is able to grasp, as a position in above three-dimensional space, the position of the target object 50 imaged by the user of the access source (hereinafter simply referred to as "user") by using the terminal device 30. Thus, the remote instructor moves the displayed polyhedron 60B to the required imaging position (the position of the user at the start of maintenance of the target object 50 in the exemplary embodiment) via the input unit 14. At this time, the CPU 11 of the remote device 10 sequentially changes the size of the polyhedron 60B in accordance with the distance between the position of the polyhedron 60B that is being moved by the remote instructor in the above three-dimensional space and the imaging position of the terminal device 30. Accordingly, the remote instructor is able to grasp the position of the polyhedron 60B in the front-back direction on the basis of the size of the polyhedron 60B.

Upon completion of moving the polyhedron 60B to the required imaging position, the remote instructor designates vertices of the polyhedron 60B that constitutes an instruction plane for which the orientation (tilt angle) faces the required imaging direction or a direction that is the closest to the required imaging direction, via the input unit 14. In accordance with the designation, the guidance image 60 in the state illustrated in FIG. 9, for example, is displayed on the guidance image setting screen.

In the above manner, in the exemplary embodiment, as an operation related to the guidance image 60, the polyhedron 60B is moved to the required imaging position, and then, the instruction plane 60A is designated. However, the present disclosure is not limited to this exemplary embodiment. For example, first, the instruction plane 60A may be designated, and then, the guidance image 60 may be moved.

The remote instructor also designates the above-described target position in the target object 50 via the input unit 14. At this time, in some cases, the target position in the target object 50 is not displayed on the displayed guidance image setting screen. In such a case, the target object 50 or the guidance image setting screen is rotated in the three-dimensional space such that the target position is seen, and then, the target position is designated.

Upon completion of the above designation related to the guidance image 60 and designation of the target position, the remote instructor selects an end button 15A via the input unit 14. In response to this, the determination in step 204 is positive, and the process advances to step 206.

In step 206, by using pieces of information designated by the remote instructor on the guidance image setting screen, the CPU 11 derives the guidance image display information and the marker display information that are described above. In step 208, the CPU 11 transmits, to the terminal device 30 that is the access source, the guidance image display information and the marker display information that are derived, and then ends the remote support process.

Note that the above exemplary embodiment has illustrated a case where a transmittance is used as the display state of the guidance image, which is changed in accordance with the deviation amount between the actual imaging state and the imaging state corresponding to the required imaging position and the required imaging orientation. However, the present disclosure is not limited to this exemplary embodiment. For example, at least one of a blinking interval and a display color may also be used as the above display state, or a combination of plural types among three types of display states including the blinking interval, the display color, and the transmittance may also be used as the display state, as described above. For example, in a case where a blinking interval is used as the display state, the blinking interval may be made shorter as the deviation amount decreases; in a case where a display color is used as the display state, the display color is made closer to red as the deviation amount decreases.

In addition, the above exemplary embodiment has illustrated a case where the instruction plane 60A having a tilt angle of 45 degrees, as illustrated in FIG. 3 for example, is used as the instruction plane of the guidance image 60. However, the present disclosure is not limited to this exemplary embodiment. For example, a perpendicular plane may also be used as the instruction plane 60A.

Figure 10:
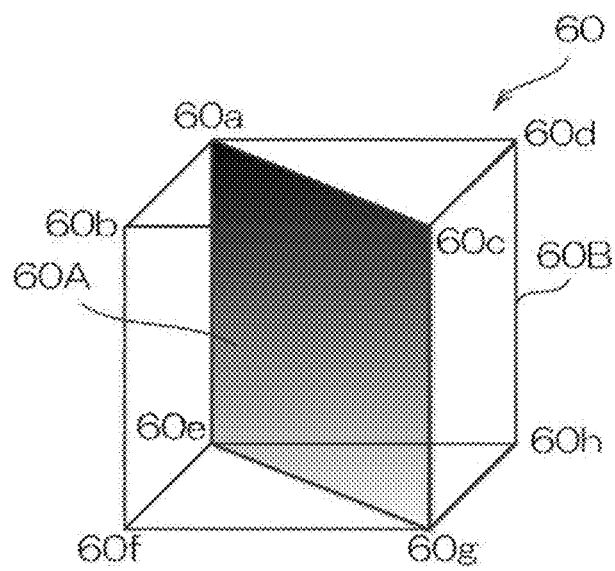
FIG. 10 illustrates a perspective view of another example of the guidance image according to the exemplary embodiment.

In this case, when a diagonally forward right direction is wished to be designated as the imaging direction, as illustrated in FIG. 10 for example, four vertices, which are the vertex 60a, the vertex 60c, the vertex 60e, and the vertex 60g, may be designated. In addition, when an outer circumferential surface of the polyhedron 60B is wished to be designated as the instruction plane 60A, for example, the vertex 60b, the vertex 60c, the vertex 60f, and the vertex 60g, may be designated. In this case, instead of designating the four vertices, a plane that is wished to be the instruction plane 60A may also be directly designated. In this exemplary embodiment, since the instruction plane 60A may be designated by a single designating operation, the instruction plane 60A may be designated more easily than in a case where the instruction plane 60A is designated by designating the vertices.

Figure 11:
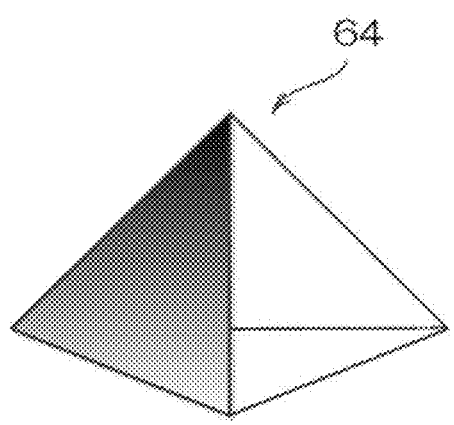
FIG. 11 illustrates a perspective view of another example of the guidance image according to the exemplary embodiment.
Figure 12:
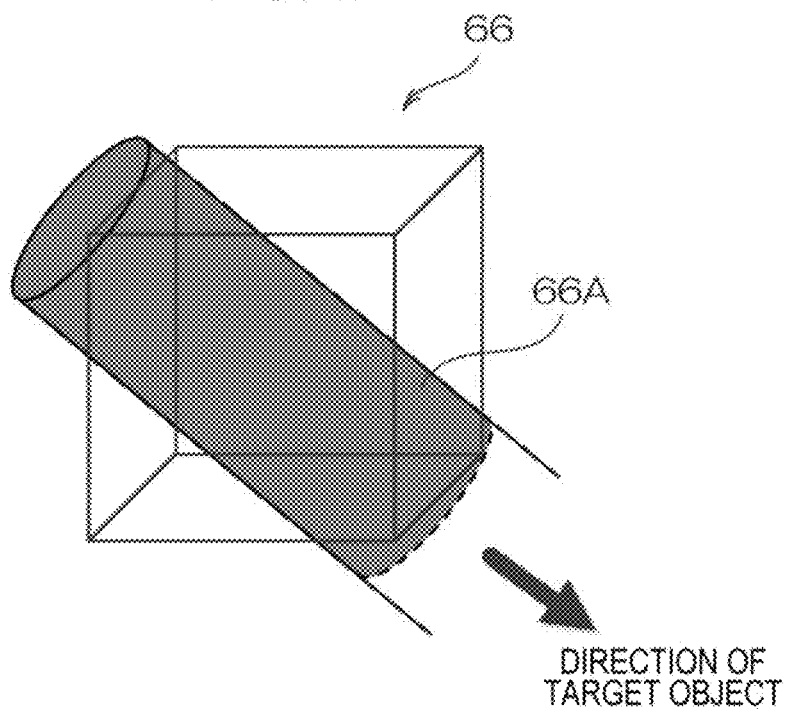
FIG. 12 illustrates a perspective view of another example of the guidance image according to the exemplary embodiment.

In addition, the above exemplary embodiment has illustrated a case where a regular hexahedron as a polyhedron is used in the guidance image. However, the present disclosure is not limited to this exemplary embodiment. As illustrated in FIG. 11 for example, a guidance image 64 in which the polyhedron is a regular tetrahedron may also be used, and also, a hexahedron, a tetrahedron, or the like whose sides have different lengths may also be used. Furthermore, the guidance image using a polyhedron is not limited to the above one having the instruction plane 60A alone. As illustrated in FIG. 12 for example, a guidance image 66 including an instruction plane and further including a columnar image 66A reaching a target object may also be used. Note that the instruction plane and the target object are omitted from the illustration in FIG. 12 to avoid complexity.

Figure 13:
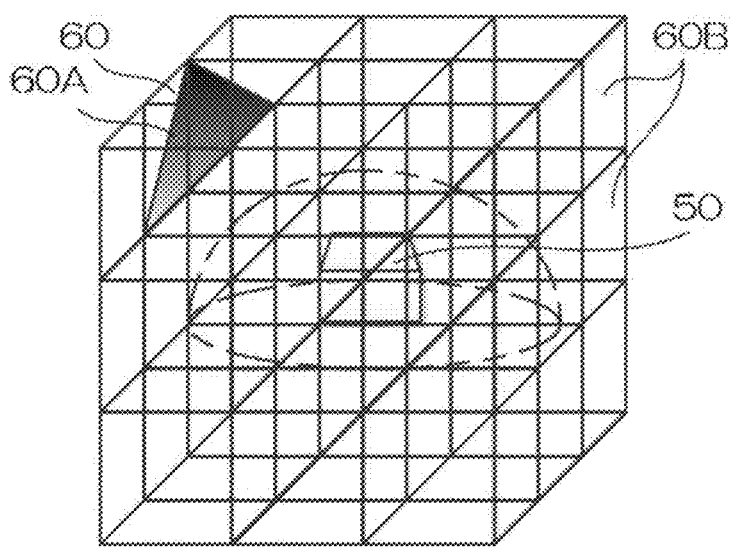
FIG. 13 illustrates a perspective view of another example of the guidance image according to the exemplary embodiment.

Furthermore, as illustrated in FIG. 13 for example, in addition to the guidance image 60, the display unit 35 of the terminal device 30 may also display plural polyhedrons 60B in a juxtaposed manner to include the area including the target object, the plural polyhedrons having a shape and a size identical to the shape and the size of the guidance image 60 and not having the instruction plane 60A. According to this exemplary embodiment, even when the target object 50 is present comparatively away, the required imaging position and the required imaging orientation that are designated by the remote instructor are easy to grasp.

Figure 14:
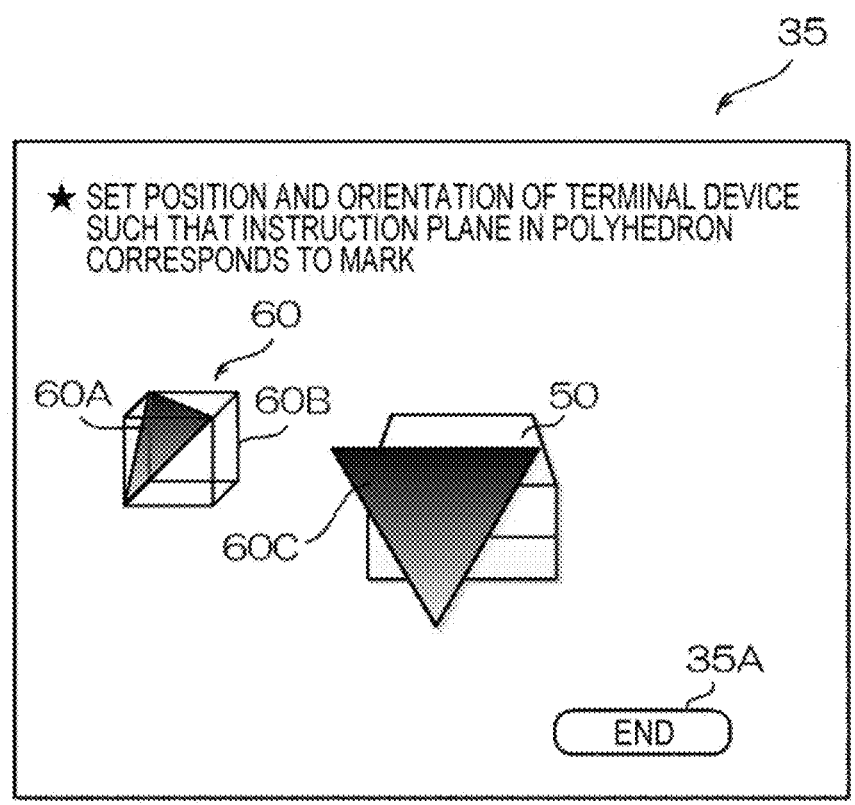
FIG. 14 illustrates a front view of another example of the guidance image display screen according to the exemplary embodiment.

Although not referred to in the above exemplary embodiment, as illustrated in FIG. 14 for example, when the actual imaging state corresponds to required imaging position and the required imaging orientation, under control of the first display control unit 31C, a mark 60C having a shape and a size identical to the shape and the size of the instruction plane 60A may be further displayed. Note that in this case, when the instruction plane 60A corresponds to the mark 60C, information indicating the completion of guiding of the user may be automatically transmitted to the remote device 10.

Although the exemplary embodiment has been described above, the technical scope of the present disclosure is not limited to the scope described in the above exemplary embodiment. Various modifications and alternations may be added to the above exemplary embodiment without departing from the spirit of the disclosure, and embodiments with the modifications and alternations are also included in the technical scope of the present disclosure.

The above exemplary embodiment is not intended to limit the disclosure defined by the claims, and not all of the combinations of features described in the exemplary embodiment are expected to be used in the disclosure. The exemplary embodiment described above includes examples in various stages, and various examples are extracted in accordance with combinations of plural disclosed elements. If some elements of all the elements described in the exemplary embodiment are removed, the configuration with these elements removed may be extracted as an example as long as an effect is obtained.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Furthermore, the above exemplary embodiment has illustrated a case where the guidance image display process and the remote support process are implemented by software configurations using a computer by executing programs. However, the present disclosure is not limited to this exemplary embodiment. For example, the guidance image display process and the remote support process may be implemented by hardware configurations or a combination of a hardware configuration and a software configuration.

Furthermore, the configurations of the remote device 10 and the terminal device 30 described in the above exemplary embodiment are examples, and thus, it is needless to say that an unnecessary part may be omitted or a new part may be added without departing from the spirit of the present disclosure.

In addition, the flows of the guidance image display process and the remote support process described in the above exemplary embodiment are also examples, and thus, it is needless to say that an unnecessary step may be skipped, a new step may be added, or the order in the process may be changed, without departing from the spirit of the present disclosure.

What is claimed is:

1. A remote support system comprising:
a terminal device; and
a remote device,
the terminal device including a first processor configured to:
transmit, to the remote device, image information obtained by imaging a non-virtual space including a target object with a non-virtual imaging unit;
receive display information that is derived by the remote device in accordance with the image information and three-dimensional position information of the target object, the display information indicating a display position and an orientation of a guidance image to be virtually displayed in a three-dimensional space in an imaging area for the target object; and
display the guidance image by using the display information that is received, the remote device including a second processor configured to:
receive the image information from the terminal device;
derive the display information in accordance with the image information that is received and the three-dimensional position information; and
transmit, to the terminal device, the display information that is derived,
wherein the guidance image comprises information that instructs both a position and an orientation of the terminal device.

2. The remote support system according to claim 1, wherein the first processor is further configured to transmit the three-dimensional position information to the remote device.

3. The remote support system according to claim 1, wherein the guidance image has an instruction plane that is virtually displayed at the display position and with the orientation in the three-dimensional space.

4. The remote support system according to claim 2, wherein the guidance image has an instruction plane that is virtually displayed at the display position and with the orientation in the three-dimensional space.

5. The remote support system according to claim 3, wherein the guidance image is a polyhedron having the instruction plane.

6. The remote support system according to claim 4, wherein the guidance image is a polyhedron having the instruction plane.

7. The remote support system according to claim 5, wherein the polyhedron is a regular polyhedron.

8. The remote support system according to claim 6, wherein the polyhedron is a regular polyhedron.

9. The remote support system according to claim 5, wherein the instruction plane is a plane that is inside the polyhedron and that has, as vertices, some of vertices of the polyhedron.

10. The remote support system according to claim 6, wherein the instruction plane is a plane that is inside the polyhedron and that has, as vertices, some of vertices of the polyhedron.

11. The remote support system according to claim 5, wherein the first processor is further configured to display, in addition to the guidance image, a plurality of polyhedrons in a juxtaposed manner with respect to an area including the target object, the plurality of polyhedrons having a shape and a size identical to a shape and a size of the polyhedron and not having the instruction plane.

12. The remote support system according to claim 5, wherein the first processor is further configured to display a mark if an actual imaging state corresponds to the display position and the orientation, the mark having a shape and a size identical to a shape and a size of the instruction plane.

13. The remote support system according to claim 5, wherein the polyhedron includes the instruction plane and further includes a columnar image reaching the target object.

14. The remote support system according to claim 13, wherein the columnar image is a cylindrical image.

15. The remote support system according to claim 1, wherein the first processor is further configured to change a display state of the guidance image in accordance with a deviation amount between an actual imaging state and an imaging state corresponding the display position and the orientation.

16. The remote support system according to claim 15, wherein the display state is at least one of a blinking interval, a display color, and a transmittance.

17. The remote support system according to claim 16, wherein the first processor is further configured to, if changing the transmittance, increase the transmittance as the deviation amount decreases.

18. The remote support system according to claim 1, wherein the first processor is further configured to, if a target position of the target object is imaged, virtually display a marker at the target position.

19. A terminal device comprising
a processor configured to:
transmit, to a remote device, image information obtained by imaging a non-virtual space including a target object with a non-virtual imaging unit;
receive display information that is derived by the remote device in accordance with the image information, the display information indicating a display position and an orientation of a guidance image to be virtually displayed in a three-dimensional space in an imaging area for the target object; and display the guidance image by using the display information that is received, wherein the guidance image comprises information that instructs both a position and an orientation of the terminal device.

20. A remote device comprising
a processor configured to:

receive, from a terminal device, image information obtained by imaging a non-virtual space including a target object with a non-virtual imaging unit;

derive display information in accordance with the image information that is received, the display information indicating a display position and an orientation of a guidance image to be virtually displayed in a three-dimensional space in an imaging area for the target object; and transmit, to the terminal device, the display information that is derived, wherein the guidance image comprises information that instructs both a position and an orientation of the terminal device.

21. The remote support system according to claim 1, wherein the image information obtained by imaging the space including the target object comprises an image.

* * * * *